(12) United States Patent
Mirassou

(10) Patent No.: US 10,627,423 B2
(45) Date of Patent: Apr. 21, 2020

(54) METHOD AND DEVICE FOR TESTING A DETECTION SENSOR FOR A MOTOR VEHICLE

(71) Applicants: Continental Automotive France, Toulouse (FR); Continental Automotive GmbH, Hannover (DE)

(72) Inventor: David Mirassou, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 38 days.

(21) Appl. No.: 16/073,093

(22) PCT Filed: Dec. 21, 2016

(86) PCT No.: PCT/EP2016/002150
§ 371 (c)(1),
(2) Date: Jul. 26, 2018

(87) PCT Pub. No.: WO2017/129212
PCT Pub. Date: Aug. 3, 2017

(65) Prior Publication Data
US 2019/0064207 A1 Feb. 28, 2019

(30) Foreign Application Priority Data
Jan. 29, 2016 (FR) ...................... 16 50738

(51) Int. Cl.
*G01P 21/02* (2006.01)
*G01P 3/489* (2006.01)
(Continued)

(52) U.S. Cl.
CPC ................ *G01P 21/02* (2013.01); *G01D 3/08* (2013.01); *G01D 5/145* (2013.01); *G01D 18/00* (2013.01);
(Continued)

(58) Field of Classification Search
CPC .......... G01P 21/02; G01P 3/489; G01D 18/00; G01D 5/145; H03K 3/011; H03B 5/04; G01L 23/10
(Continued)

(56) References Cited

U.S. PATENT DOCUMENTS 6,557,131 B1 * 4/2003 Arabi .................... H03M 1/109
714/733
6,590,384 B1 7/2003 Draxelmayr
(Continued)

FOREIGN PATENT DOCUMENTS

DE 19634714 A1 3/1998
EP 1331744 A1 7/2003

OTHER PUBLICATIONS

English translation of the Written Opinion for International Application No. PCT/EP2016/002150, dated May 9, 2017, 5 pages.
(Continued)

*Primary Examiner* — Melissa J Koval
*Assistant Examiner* — Trung Nguyen
(74) *Attorney, Agent, or Firm* — RatnerPrestia

(57) ABSTRACT

A method for testing a detection sensor positioned facing a target fixed to a drive shaft that is intended to be installed in a motor vehicle. The method includes generating a pulsed voltage test signal, amplifying the high states of the generated test signal, filtering the amplified test signal so as to obtain a voltage test signal having high states the voltage of which is higher than a predetermined high-state detection threshold and low states the voltage of which is lower than a predetermined low-state detection threshold, and detecting the high states and the low states of the filtered test signal in order to test the sensor.

9 Claims, 4 Drawing Sheets

(51) Int. Cl.
*G01D 5/14* (2006.01)
*G01D 3/08* (2006.01)
*G01D 18/00* (2006.01)

(52) U.S. Cl.
CPC ........ *G01P 3/489* (2013.01); *H04B 2203/547* (2013.01); *H04B 2203/5416* (2013.01); *H04B 2203/5458* (2013.01)

(58) Field of Classification Search
USPC ........ 324/200, 202, 207.2–207.25, 226, 631, 324/166, 160, 600, 167, 76.11
See application file for complete search history.

(56) References Cited

U.S. PATENT DOCUMENTS

2016/0352263 A1* 12/2016 Guo ........................... H02P 6/30
2017/0317622 A1* 11/2017 Cai ....................... H02K 21/185

OTHER PUBLICATIONS

International Search Report and Written Opinion for International Application No. PCT/EP2016/002150, dated May 9, 2017—7 pages.

* cited by examiner

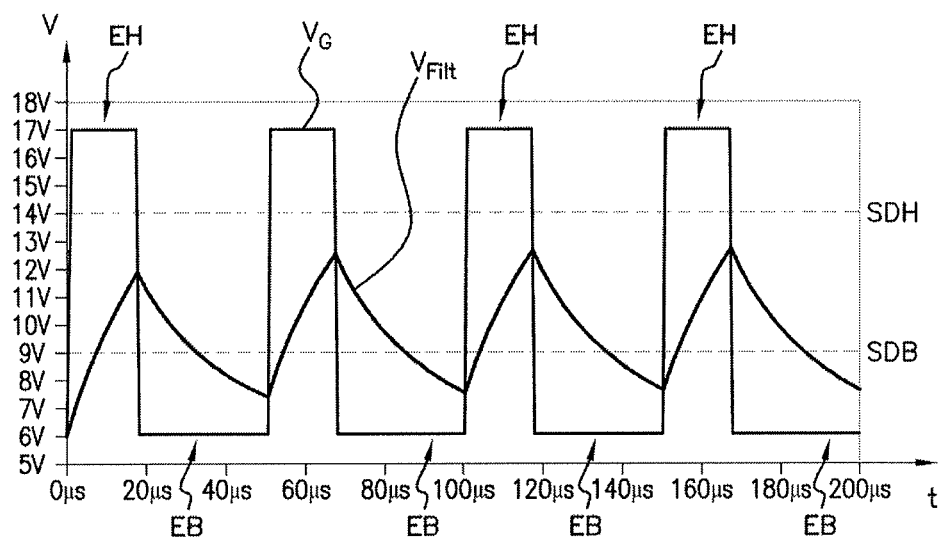
Fig 1: prior art
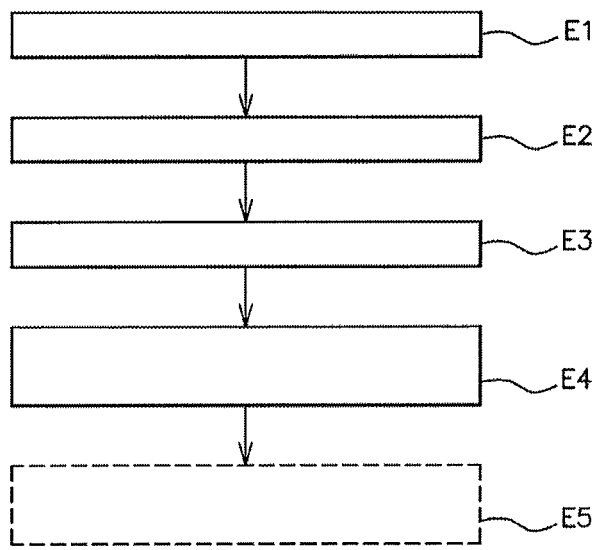
Fig 6

METHOD AND DEVICE FOR TESTING A DETECTION SENSOR FOR A MOTOR VEHICLE

CROSS REFERENCE TO RELATED APPLICATIONS

This application is the U.S. National Phase Application of PCT International Application No. PCT/EP2016/002150, filed Dec. 21, 2016, which claims priority to French Patent Application No. 1650738, filed Jan. 29, 2016, the contents of such applications being incorporated by reference herein.

FIELD OF THE INVENTION

The present invention relates to the field of testing detection sensors for motor vehicles, and pertains more particularly to a method and to a system for testing a sensor for detecting a target fixed to a drive shaft of a motor vehicle.

The invention is applicable in particular in the detection of a target fixed to a crankshaft, a camshaft or a transmission shaft of a motor vehicle.

BACKGROUND OF THE INVENTION

In a motor vehicle, it is known to use what are termed 'detection' sensors to determine the position of a drive shaft or else its rotational speed. Such a shaft may be for example a crankshaft, a camshaft or a transmission shaft of a motor vehicle.

The sensor is installed facing a target that is fixed coaxially on the drive shaft. This target takes the form, as is known, of a crown made of a ferromagnetic material and including a sequence of teeth and cavities.

As is also known, the sensor comprises an electric power supply connector by way of which it is supplied with DC voltage, for example 5 V, so as to operate in the vehicle, an electric output connector and a ground connector.

In order to determine the position or the speed of the shaft, the sensor includes an integrated circuit configured to measure the magnetic field variations generated by the passing of the teeth and cavities of the target in front of the sensor.

The sensor thus generates a digital output signal representing the passing of the teeth and of the cavities characterizing the position or the rotational speed of the shaft. This signal is supplied, via the output connector, to a computer of the vehicle, which analyzes said signal in order to determine the position or the rotational speed of the shaft.

In order to allow such a sensor to meet electromagnetic compatibility standards, it is known to attenuate the power supply signal of the sensor by installing a filtering circuit in the sensor, between the connectors and the integrated circuit.

Moreover, it is known to carry out tests on this type of sensor using a test device that communicates information with the sensor via a test protocol.

The tests performed on the sensor may consist in collecting samples of the output signal from the sensor representing periodic variations in the magnetic field that are generated by the rotation of the target in front of the sensor at a given speed, for example several samples per period of the signal.

To send test commands to the sensor, the test device generates a test signal including test information, which signal is sent on the power supply line of the sensor. Thus, when the sensor is used in the vehicle during operation, it is supplied with a DC voltage power supply signal, for example with a value of the order of 5 V, but when the sensor has to be tested by the test device, the latter delivers, on the power supply line of the sensor, a pulsed voltage test signal defined by a test protocol and representative of the test information.

As illustrated in FIG. 1, this test signal (denoted '$V_G$' in the figure) may consist in exchanging binary information of 0 or 1 type, for example coded in terms of pulse width in the form of high states EH with a width of ⅓ to represent the binary value 1 alternating with low states EB with a width of ⅔ to represent the binary value 0. In FIG. 1, the high states EH have a value of the order of 17 V and the low states EB have a value of the order of 6 V, so as easily to be able to distinguish them from one another. However, as these values are able to vary, the sensor detects a high state EH of the test signal when the latter exceeds a predetermined high-state detection threshold SDH (of 14 V in FIG. 1). Likewise, a low state EB may be detected when the value of the test signal is lower than a predetermined low-state detection threshold SDB (of 9 V in FIG. 1).

When it is desired to test the sensor at high rotational speeds of the shaft, for example higher than 500 RPM, it is necessary to deliver a test signal the frequency of which is high enough to allow collection of several samples per period of the signal representative of the variations in magnetic field, for example at least 20 kHz.

However, at such frequencies, the test signal may be attenuated significantly by the filtering circuit (the filtered test signal being denoted '$V_{Filt}$' in FIG. 1), such that it may not cross the predetermined high-state detection threshold SDH. In this case, the sensor is not able to determine whether binary test information is contained in the test signal, thereby preventing the test device from collecting the samples, and therefore constituting a major drawback.

SUMMARY OF THE INVENTION

The aim of an aspect of the invention is to at least partly rectify these drawbacks by proposing a simple, reliable and effective solution for testing detection sensors at high frequencies.

To this end, the first subject of an aspect of the invention is a method for testing a detection sensor positioned facing a target fixed to a drive shaft that is intended to be installed in a motor vehicle, said detection sensor being configured to measure the magnetic field variations generated by the passing of the target in front of the sensor and to generate an output signal representative of said variations, said method comprising the steps of:

generating a pulsed voltage test signal comprising high states the value of which is higher than a predetermined high-state detection threshold and low states the value of which is lower than a predetermined low-state detection threshold, the high states and the low states coding test information for collecting data relating to the output signal from the sensor, amplifying the high states of said generated test signal, filtering the amplified test signal so as to obtain a filtered test signal having high states the voltage of which is higher than the predetermined high-state detection threshold and low states the voltage of which is lower than the predetermined low-state detection threshold, and detecting the high states and the low states of the filtered test signal in order to test the sensor.

Thus, with the method according to an aspect of the invention, the amplification of the high states of the generated test signal makes it possible to ensure that the high states of the filtered test signal are higher than the predetermined high-state detection threshold, so that the sensor is able to correctly interpret the binary information contained in the generated test signal.

Preferably, with the filtering being characterized by a predetermined filtering coefficient, the amplification is performed by an amplification coefficient equal to the reciprocal of the predetermined filtering coefficient.

Again preferably, the method furthermore comprises a step of collecting and analyzing data relating to the output signal generated by the sensor.

An aspect of the invention also relates to a system for testing a sensor for detecting a target fixed to a drive shaft that is intended to be installed in a motor vehicle, said system comprising:
- a generation module configured to generate a pulsed voltage test signal comprising high states the value of which is higher than a predetermined high-state detection threshold and low states the value of which is lower than a predetermined low-state detection threshold, the high states and the low states coding test information for collecting data relating to the output signal from the sensor,
- an amplification module linked electrically to the generation module in order to receive a test signal generated by said generation module and configured to amplify the high states of said received test signal,
- a drive shaft on which a target is installed, and
- a detection sensor positioned facing said target and connected electrically to the amplification module in order to receive a test signal amplified by said amplification module, said sensor comprising a filtering circuit configured to filter said amplified test signal and an integrated circuit configured to measure the magnetic field variations generated by the passing of the target in front of the sensor, to generate an output signal representative of said variations and to detect, beyond a predetermined high-state detection threshold, high states of a test signal filtered by the filtering circuit and, below a predetermined low-state detection threshold, low states of the test signal filtered by the filtering circuit in order to test the sensor.

Preferably, the filtering circuit is characterized by a predetermined filtering coefficient and the amplification module is configured to amplify the generated test signal by an amplification coefficient equal to the reciprocal of the predetermined filtering coefficient.

In one preferred embodiment, the amplification module comprises an operational amplifier receiving, at its negative input, the generated test signal, and a filtering circuit, identical to the filtering circuit of the integrated circuit of the sensor, the input of which is linked to the output of the operational amplifier and the output of which is linked to the positive input of the operational amplifier.

Preferably, the amplification module furthermore comprises a current amplification sub-module positioned between the output of the operational amplifier and the input of the filtering circuit of the amplification module.

Again preferably, the filtering circuit of the sensor is formed of a resistor and of a capacitor.

Advantageously, the system furthermore comprises a management module configured to receive and analyze data relating to the output signal from the sensor in order to determine the operating state thereof.

An aspect of the invention also relates to a motor vehicle comprising a test system in which the drive shaft and the detection sensor are installed.

BRIEF DESCRIPTION OF THE DRAWINGS

Other features and advantages of aspects of the invention will emerge during the following description, given with reference to the appended figures, which are given by way of non-limiting example and in which identical references are given to similar objects.

FIG. 1 (prior art) schematically illustrates a generated test signal sent to a detection sensor to test it and the test signal thus received and filtered by the sensor, as a function of time.

FIG. 6 illustrates an embodiment of the method according to an aspect of the invention.

DETAILED DESCRIPTION OF THE PREFERRED EMBODIMENTS

The test system according to an aspect of the invention makes it possible to test a sensor for detecting a target fixed to a drive shaft for a motor vehicle, in particular by allowing the collection of data relating to the output signal delivered by said sensor, such as for example the value of the magnetic field measured by the sensor.

Figure 2:
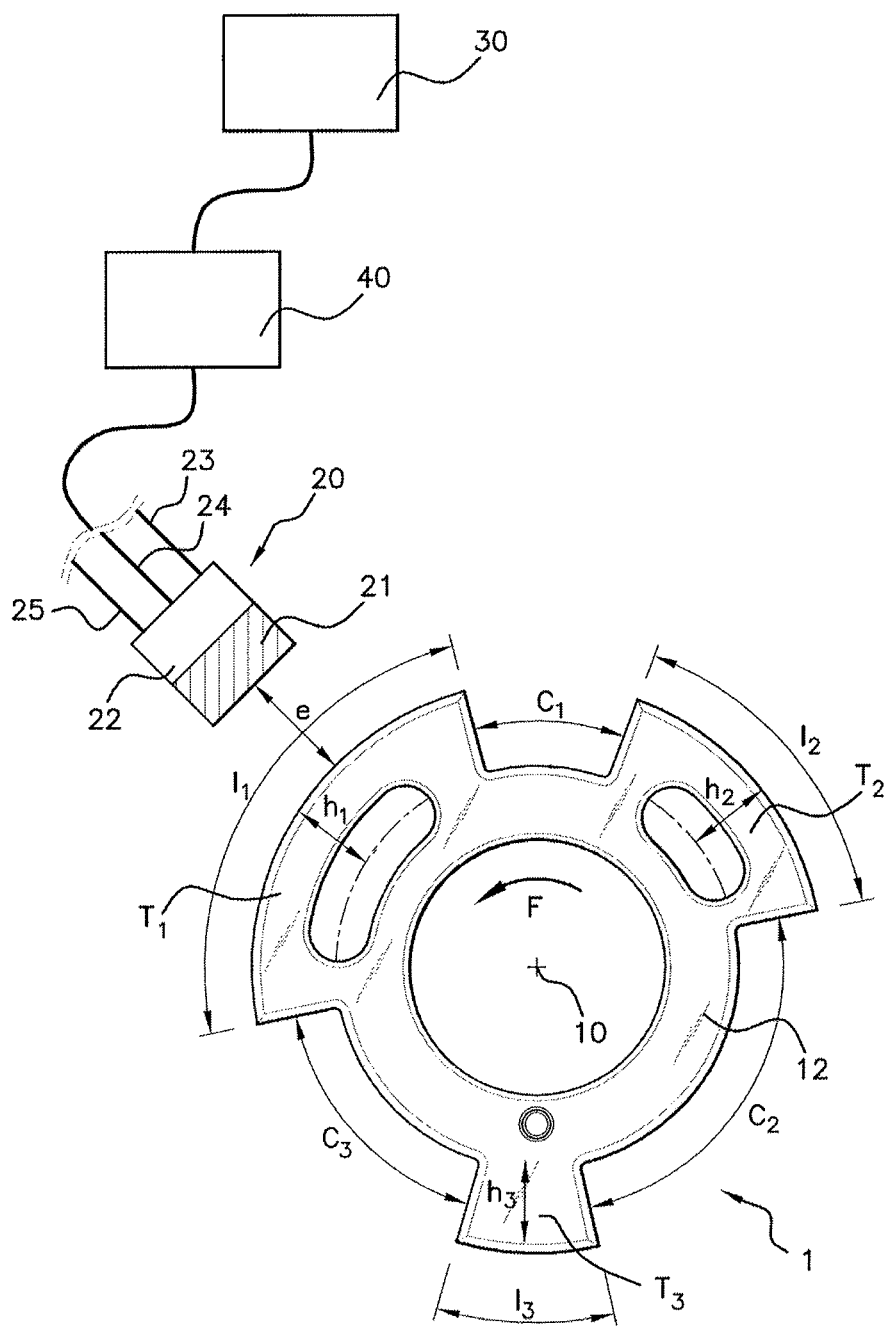
FIG. 2 schematically illustrates one embodiment of the system according to an aspect of the invention.

To this end, with reference to FIG. 2, the system 1 comprises a drive shaft 10, on which a target 12 is installed, a detection sensor 20 positioned facing said target 12, a generation module 30 and an amplification module 40.

The tests may be carried out using a detection sensor 20 installed on a test bench facing a target 12 on a test drive shaft 10, allowing simulation of the operation of a motor vehicle drive shaft, or else using a detection sensor 20 already installed in a motor vehicle. In the latter case, the drive shaft 10 may be for example a crankshaft, a camshaft or a transmission shaft.

To perform these tests, it is necessary to generate a test signal as will be described hereinafter. This test signal is a pulsed voltage signal comprising high states alternating with low states of the test signal, which states are representative of test information allowing the sensor 20 to collect data relating to its output signal.

Figure 4:
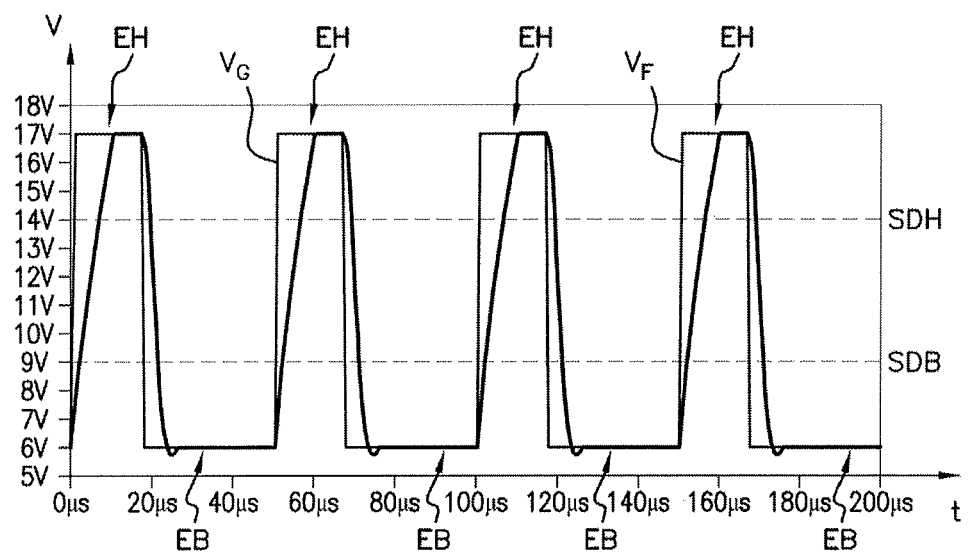
FIG. 4 schematically illustrates, as a function of time, a generated test signal and the corresponding filtered test signal in the system of FIG. 3.

In the non-limiting example illustrated in FIG. 4, this pulsed voltage test signal $V_G$ has high states EH at 17 V and low states EB at 6 V. The high states EH are coded in terms of pulse width so as to transmit binary information, for example 1 when the width of the generated test signal $V_G$ in the high state EH is one third of a period, and 0 when the width of the generated test signal $V_G$ in the high state EH is two thirds of a period.

The drive shaft 10 comprises a target 12 associated with the detection sensor 20.

In the example illustrated in FIG. 2, the target 12 takes the form of a metal crown fixed integrally to the drive shaft 10.

This target 12 has, at its periphery, a plurality of teeth $T_1$, $T_2$, $T_3$ (three teeth in this non-limiting example) of which the height $h_1$, $h_2$, $h_3$, the length $l_1$ to $l_3$ and the spacings (cavities) $C_1$ to $C_3$, respectively, may vary substantially.

These variable lengths and spacings constitute, in a manner known per se, a code, measured by the sensor 20 and decoded by the central computer. The operation of such a sensor 20 plus target 12 assembly is described hereinafter.

When the target 12 is driven in rotation (arrow F) by the drive shaft 10, the sensor 20 perceives a series of variations in the magnetic field representative of the length $l_1$ to $l_3$ of the teeth $T_1, T_2, T_3$ passing in front of it and of their spacings $C_1, C_2, C_3$.

As this operation is known, it will not be described in greater detail here.

With continuing reference to FIG. 2, the detection sensor 20 is positioned facing the target 12 and is connected electrically to the amplification module 40 in order to receive a test signal ($V_A$ in FIGS. 3 and 5) amplified by said amplification module 40, as will be described hereinafter.

In this nonlimiting example, the detection sensor 20 includes a ferromagnetic element 21 for generating a magnetic field close to the target 12. Rotating the target 12 modulates this magnetic field depending on the passing of the teeth $T_1, T_2, T_3$ and of the cavities $C_1, C_2, C_3$.

The detection sensor 20 also includes a module 22 for detecting the magnetic field, a power supply connector 23, an output connector 24 and a ground connector 25. This detection module 22 comprises for example a Hall sensor for detecting the magnetic field variations generated by the target 12 and delivering an output signal representative of said variations.

Figure 3:
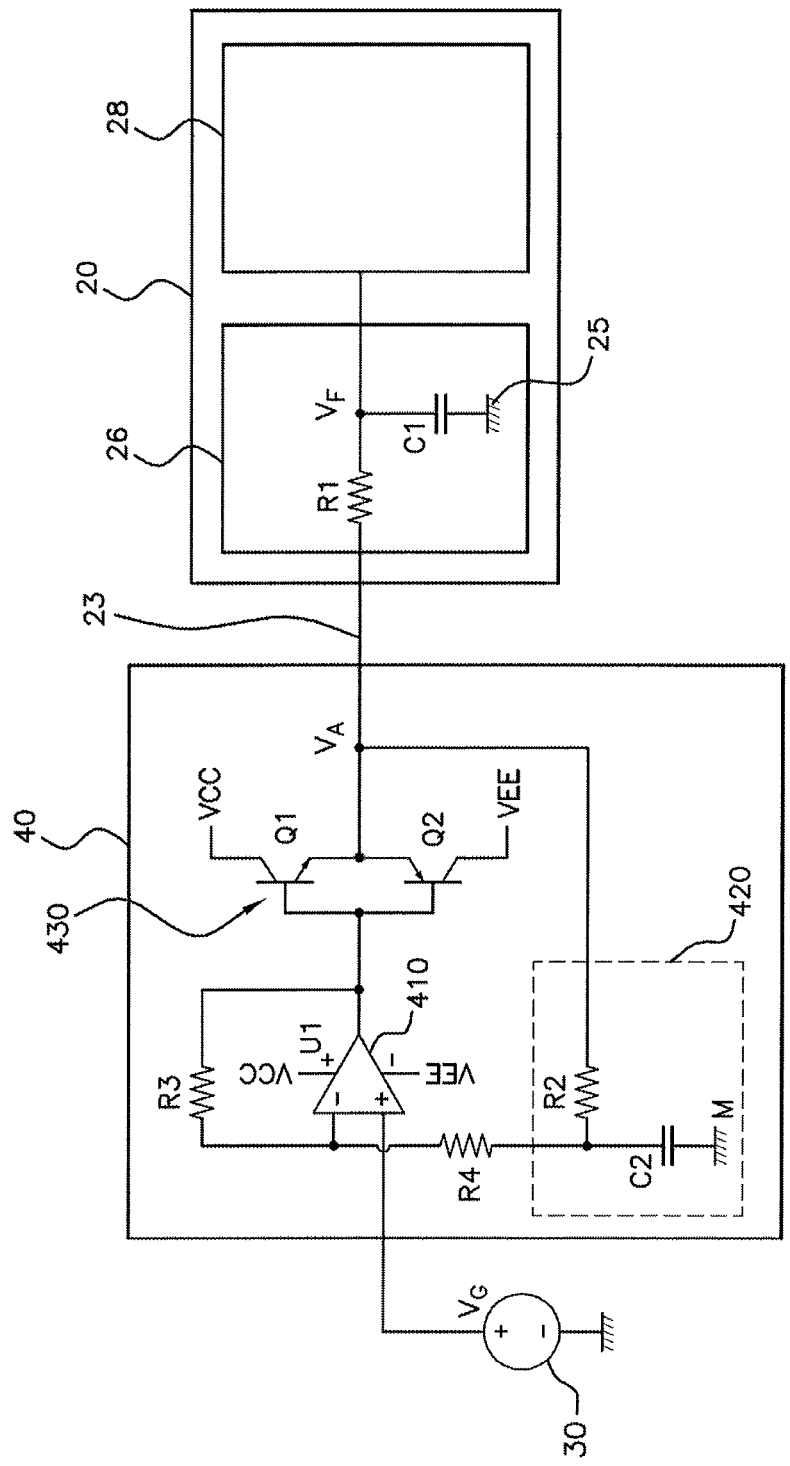
FIG. 3 is a partial view of the system of FIG. 2 in which the amplification module and the filtering circuit have been shown in detail.

The module 22 for detecting the magnetic field also comprises a filtering circuit 26 and an integrated circuit 28 (cf. FIG. 3).

Figure 5:
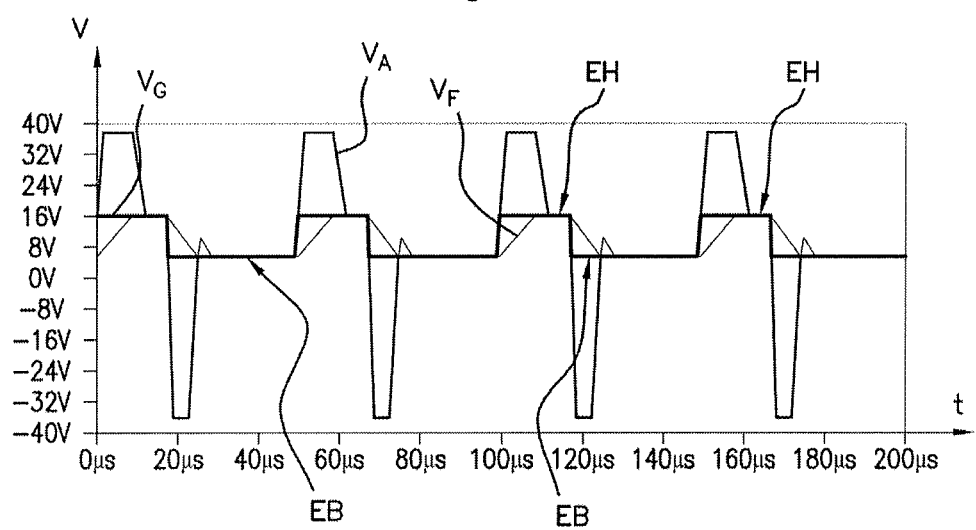
FIG. 5 schematically illustrates, as a function of time, a generated test signal, the corresponding amplified test signal and the corresponding filtered test signal in the system of FIG. 3.

The filtering circuit 26 is configured to receive and to filter the test signal $V_A$ amplified by the amplification module 40 in order to obtain a filtered test signal $V_F$ (with reference to FIGS. 4 and 5). The terms 'filter' and 'filtering' are understood to mean that the high-frequency signals are attenuated, such filtering making it possible to attenuate high-frequency external interference present on the power supply connector 23 in a manner known per se.

To this end, the filtering circuit 26 comprises a resistor R1 and a capacitor C1. The resistor R1 is linked firstly to the power supply connector 23 of the sensor 20 and secondly to the capacitor C1. The capacitor C1 is linked firstly to the resistor R1 and secondly to the ground connector 25.

By way of non-limiting example, the value of the resistor R1 may be 47 ohms, and the value of the capacitor C1 may be 470 nF.

The filtering circuit 26 is characterized by a predetermined filtering coefficient corresponding for example to a reduction by a predetermined factor, depending on the values of the resistor R1 and of the capacitor C1, of the maximum amplitude of the signal received at the input of the filter.

The integrated circuit 28 is first of all configured to measure the magnetic field variations generated by the passing of the target 12 in front of the sensor 20 and to generate an output signal representative of the variations in the measured magnetic field, this output signal being delivered via the output connector 24.

When the vehicle is operating, the output signal is delivered to a computer of the vehicle (not shown), which analyzes it in order for example to determine the position or the rotational speed of the shaft 10.

In a test phase, with reference to FIGS. 4 and 5, the integrated circuit 28 is configured to detect, beyond a predetermined high-state detection threshold SDH, high states EH of the test signal $V_F$ filtered by the filtering circuit 26 and, below a predetermined low-state detection threshold SDB, low states EB of the test signal $V_F$ filtered by the filtering circuit 26.

More precisely, the integrated circuit 28 is configured to detect the high states EH of the test signal $V_F$ filtered by the filtering circuit 26 when the voltage value of the test signal exceeds a predetermined high-state detection threshold SDH, for example of the order of 14 V. Thus, when the voltage value of the filtered test signal $V_F$ is higher than the predetermined high-state detection threshold SDH, the integrated circuit 28 detects a high state EH and is able to determine the value of the binary item of information (0 or 1) depending on whether the width of the high state is one third or two thirds of the period of the signal.

Likewise, the integrated circuit 28 is configured to detect the low states EB of the test signal $V_F$ filtered by the filtering circuit 26 when the voltage value of the signal $V_F$ is below a predetermined low-state detection threshold SDB, for example of the order of 9 V. Thus, when the voltage value of the filtered test signal $V_F$ is lower than the predetermined low-state detection threshold SDB, the integrated circuit 28 detects a low state EB and is able to determine the value of the binary item of information (0 or 1) depending on whether the width of the low state EB is one third or two thirds of the period of the signal, and thus ensure correct interpretation of the binary information contained in the filtered test signal $V_F$ by the integrated circuit 28.

Such detection allows the integrated circuit 28 to determine the binary information contained in the filtered test signal $V_F$ in order to collect data relating to the output signal so as to supply said data to a management module (not shown). This management module is configured to analyze these received data in order to determine the operating state thereof.

The integrated circuit 28 is configured to collect the data relating to the output signal from test messages coded in a received test signal $V_F$ filtered by the filtering circuit 26.

The generation module 30 is configured to generate a pulsed voltage test signal $V_G$ comprising high states EH the value of which is higher than a predetermined high-state detection threshold SDH and low states EB the value of which is lower than a predetermined low-state detection threshold SDB, the high states EH and the low states EB coding test information for collecting data relating to the output signal from the sensor 20, as described above.

The amplification module 40 is positioned between the generation module 30 and the sensor 20. It is connected electrically to the generation module 30 in order to receive a test signal $V_G$ generated by said generation module 30, and to the sensor 20, via the power supply line 23, in order to supply it with an amplified test signal $V_A$.

To this end, the amplification module 40 is configured to amplify the high states EH of said generated test signal $V_G$ received from the generation module 30 by an amplification coefficient or factor that is high enough to guarantee that the high states EH of the test signal will still be higher than the predetermined high-state detection threshold SDH of the sensor 20 when the amplified test signal $V_A$ has been filtered by the filtering circuit 26 of the sensor 20, such that the integrated circuit 28 is able to correctly decode the binary information contained in the filtered test signal $V_F$ in order to collect data relating to the output signal from the sensor 20.

Preferably, as illustrated in FIG. 3, the amplification module 40 comprises an operational amplifier 410 and a filtering circuit 420.

The operational amplifier 410 is supplied with two supply voltages Vcc and Vee in a manner known per se, for example of 40 V and −40 V, respectively.

The operational amplifier 410 receives, at its positive input, the test signal $V_G$ generated by the generation module 30.

The filtering circuit of the amplification module 40 is formed of a resistor R2 positioned between the negative input and the output of the operational amplifier 410, and of a capacitor C2 positioned between the negative input of the operational amplifier 410 and ground M.

The resistor R2 and capacitor C2 values of the filtering circuit 420 of the amplification module 30 are identical to the resistor R1 and capacitor C1 values of the filtering circuit 26 of the sensor 20, so as to simulate the filtering of the signal amplified by the operational amplifier 410 in a loop that makes it possible to ensure that the amplification coefficient of the test signal generated by the generation module 30 is sufficient for the high states EH of the test signal filtered by the filtering circuit 26 of the sensor 20 to be higher than the predetermined high-state detection threshold SDH.

It will be noted that it is also possible to use resistor R2 and capacitor C2 values of the filtering circuit 420 of the amplification module 30 that are different from the resistor R1 and capacitor C1 values of the filtering circuit 26 of the sensor 20, but that produce identical filtering. To this end, the time constant of the two filtering circuits 26, 420 must be the same. As the time constant T of an RC filtering circuit is equal to R*C, it is possible to choose a pair of values (R2, C2) having the same time constant as R1*C1, i.e. R2*C2=R1*C1.

In order to ensure that the amplification coefficient of the test signal generated by the generation module 30 is sufficient for the high states EH of the test signal filtered by the filtering circuit 26 of the sensor 20 to be higher than the predetermined high-state detection threshold SDH, the generated test signal $V_G$ is amplified, at least over a portion of the high states EH, by an amplification coefficient at least equal to the reciprocal of the predetermined filtering coefficient.

In the embodiment illustrated in FIG. 3, the amplification module 40 furthermore comprises an optional assembly 430, formed of a transistor Q1 of NPN type and a transistor Q2 of PNP type, which transistors are stacked. This assembly 430, which is positioned between the operational amplifier 410 and the filtering circuit 420, is connected firstly to the supply voltage Vcc and secondly to the reference voltage Vee, as illustrated in FIG. 3. This assembly 430 makes it possible to increase the maximum value of the output current of the operational amplifier in order to supply a higher current to the filtering circuit 26 of the sensor 20 so as to allow fast charging and discharging of the capacitor C1, and therefore fast transition edges of the filtered test signal $V_F$ between the low states EB and the high states EH. The voltage gain of this transistor is equal to 1, so as not to modify the value of the output voltage of the amplification module 40.

The method according to an aspect of the invention makes it possible to test the detection sensor using a pulsed voltage test signal comprising test information coded in high states EH the value of which is higher than the predetermined high-state detection threshold SDH of the sensor 20 and low states EB the value of which is lower than the predetermined low-state detection threshold SDB of the sensor 20.

The method will be described in particular with reference to FIGS. 4 and 5. For the sake of clarity, FIG. 4 illustrates only the generated test signal $V_G$ and the filtered test signal $V_F$, whereas FIG. 5 illustrates the generated test signal $V_G$, the amplified test signal $V_A$ and the filtered test signal $V_F$.

The generation module 30 first of all generates a test signal $V_G$ in a step E1 (cf. FIG. 6) and transmits it to the amplification module 40.

The amplification module 40 then amplifies the generated test signal $V_G$, in a step E2, in particular its high states EH, as illustrated in FIG. 5, and then transmits the test signal $V_A$ thus amplified to the sensor 20 via its power supply line 23.

The filtering circuit 26 of the sensor 20 receives and filters, in a step E3, the amplified test signal $V_A$ received from the amplification module 40 so as to obtain a filtered test signal $V_F$ having high states EH the voltage value of which is higher than the predetermined high-state detection threshold SDH and low states EB the voltage value of which is lower than the predetermined low-state detection threshold SDB, as illustrated in FIG. 4.

The filtered test signal $V_F$ is then supplied to the integrated circuit 28, which decodes it, in a step E4, so as to obtain the test information contained in said filtered test signal $V_F$ in order to collect data relating to the output signal from the sensor and supply said data to the management module, which analyzes these data in order to determine the operating state of the sensor 20, in a step E5.

It is clarified furthermore that aspects of the present invention are not limited to the examples described above, and is open to many variants that are accessible to those skilled in the art.

The invention claimed is:

1. A method for testing a detection sensor positioned facing a target fixed to a drive shaft that is intended to be installed in a motor vehicle, said detection sensor being configured to measure magnetic field variations generated by passing of the target in front of the detection sensor and to generate an output signal representative of said variations, said method comprising:
   generating, by a generation module, a pulsed voltage test signal comprising high states the value of which is higher than a predetermined high-state detection threshold and low states the value of which is lower than a predetermined low-state detection threshold, the high states and the low states coding test information for collecting data relating to the output signal from the detection sensor,
   amplifying, by an amplification module, the high states of said generated test signal into an amplified test signal,
   filtering, by a filtering circuit, the amplified test signal, the filtering being characterized by a predetermined filtering coefficient, the amplification is performed by an amplification coefficient equal to a reciprocal of the predetermined filtering coefficient, so as to obtain a filtered test signal having high states the voltage of which is higher than the predetermined high-state detection threshold and low states the voltage of which is lower than the predetermined low-state detection threshold, and
   detecting, by an integrated circuit, the high states and the low states of the filtered test signal in order to test the detection sensor.

2. The method as claimed in claim 1, furthermore comprising collecting and analyzing, by a management module, data relating to the output signal generated by the detection sensor.

3. A system for testing a sensor for detecting a target fixed to a drive shaft that is intended to be installed in a motor vehicle, said system comprising:

a generation module configured to generate a pulsed voltage test signal comprising high states the value of which is higher than a predetermined high-state detection threshold and low states the value of which is lower than a predetermined low-state detection threshold, the high states and the low states coding test information for collecting data relating to an output signal from the sensor, an amplification module linked electrically to the generation module in order to receive a test signal generated by said generation module and configured to amplify the high states of said received test signal, a drive shaft on which a target is installed, and a detection sensor positioned facing said target and connected electrically to the amplification module in order to receive a test signal (VA) amplified by said amplification module, said sensor comprising:

a filtering circuit configured to filter said amplified test signal, characterized by a predetermined filtering coefficient, and the amplification module being configured to amplify the generated test signal by an amplification coefficient equal to a reciprocal of the predetermined filtering coefficient, and an integrated circuit configured to measure the magnetic field variations generated by the passing of the target in front of the sensor, to generate an output signal representative of said variations and to detect, beyond the predetermined high-state detection threshold, high states of a test signal filtered by the filtering circuit and, below a predetermined low-state detection threshold, low states of the test signal filtered by the filtering circuit in order to test the sensor.

4. The test system as claimed in claim 3, wherein the amplification module comprises an operational amplifier receiving, at a negative input of the operational amplifier, the generated test signal, and a filtering circuit, identical to the filtering circuit of the integrated circuit of the sensor, the input of which is linked to the output of the operational amplifier and the output of which is linked to a positive input of the operational amplifier.

5. The test system as claimed claim 3, wherein the amplification module furthermore comprises a current amplification sub-module positioned between the output of the operational amplifier and the input of the filtering circuit of the amplification module.

6. The test system as claimed in claim 3, wherein the filtering circuit of the sensor is formed of a resistor and of a capacitor.

7. The test system as claimed in claim 3, furthermore comprising a management module configured to receive and analyze data relating to the output signal from the sensor in order to determine the operating state thereof.

8. The test system as claimed in claim 3, comprising a motor vehicle in which the drive shaft and the detection sensor are installed.

9. The test system as claimed in claim 4, wherein the amplification module furthermore comprises a current amplification sub-module positioned between the output of the operational amplifier and the input of the filtering circuit of the amplification module.

* * * * *